Sept. 19, 1967   J. B. COLE   3,342,117
COLLATING APPARATUS
Filed March 10, 1965   7 Sheets-Sheet 1

FIG-1

INVENTOR.
JAMES B. COLE
BY
Stanley Bialos
ATTORNEY

INVENTOR.
JAMES B. COLE
BY
Stanley Bialos
ATTORNEY

FIG-9

FIG-10 though only a section thereof is illustrated in the drawings.

United States Patent Office 3,342,117
Patented Sept. 19, 1967

3,342,117
COLLATING APPARATUS
James B. Cole, Concord, Calif., assignor to Crown Zellerbach Corporation, San Francisco, Calif., a corporation of Nevada
Filed Mar. 10, 1965, Ser. No. 438,666
19 Claims. (Cl. 93—93)

This invention relates to collating apparatus and, more particularly, to a collator for relatively flat articles such as paper grocery bags.

In packaging generally flat articles which are somewhat thicker along one edge or end portion thereof than elsewhere, it is common to collate or alternate the articles in a predetermined progression so that when a substantial number thereof are grouped together to form a package, the package is of relatively uniform dimension thereacross. Self-opening, paper grocery bags are an example of articles of this type since they are open at one end and have a closed bottom which is folded in a manner such that it overlaps a portion of the bag side wall. Consequently, each bag is thicker throughout such overlapped portion thereof, and the bags prior to their being packaged are usually collated so that a predetermined number thereof comprising a "hand" all have their bottoms oriented in one direction, the next group comprising another "hand" of equal number have the bag bottoms thereof oriented in the opposite direction, and successive hands are similarly alternated end for end so that a bundle or package constituting a plurality of hands is of relatively uniform dimension thereacross.

An exemplary apparatus for collating bags in this manner is disclosed in Dexter Patent No. 3,135,175. In such patented apparatus, bags successively discharged from a bag-making machine are advanced in a predetermined path along or in the direction of their longitudinal axes into a collating station whereat each bag is gripped by one or the other of two pairs of collating discs operative to rotate each bag through an angular distance approximating 90° and into the flights of a pair of spiral conveyors which remove the rotated bags. The particular angular direction in which each bag is rotated depends upon which pair of collating discs grips the bag; and the apparatus functions so that one pair of discs grips and rotates in one angular direction a predetermined number of bags that together comprise a hand thereof, and then the other pair of discs rotates in the opposite angular direction another predetermined number of bags to form the next successive hand. The two pairs of discs repetitively alternate in their control of the bags to collate the same into successive oppositely oriented hands.

The present invention constitutes an improvement over the article collating apparatus disclosed in the aforementioned Patent No. 3,135,175; and among the objects of this invention are the provision of a collating apparatus more adapted to high speed operations than the prior apparatus, the provision of a structurally and functionally simpler apparatus, and the provision of an improved collator more positive in its control and handling of paper bags and the like.

Additional objects and advantages of the invention will become apparent as the specification develops.

An embodiment of the invention is illustrated in the accompanying drawings, in which.

Figure 1:
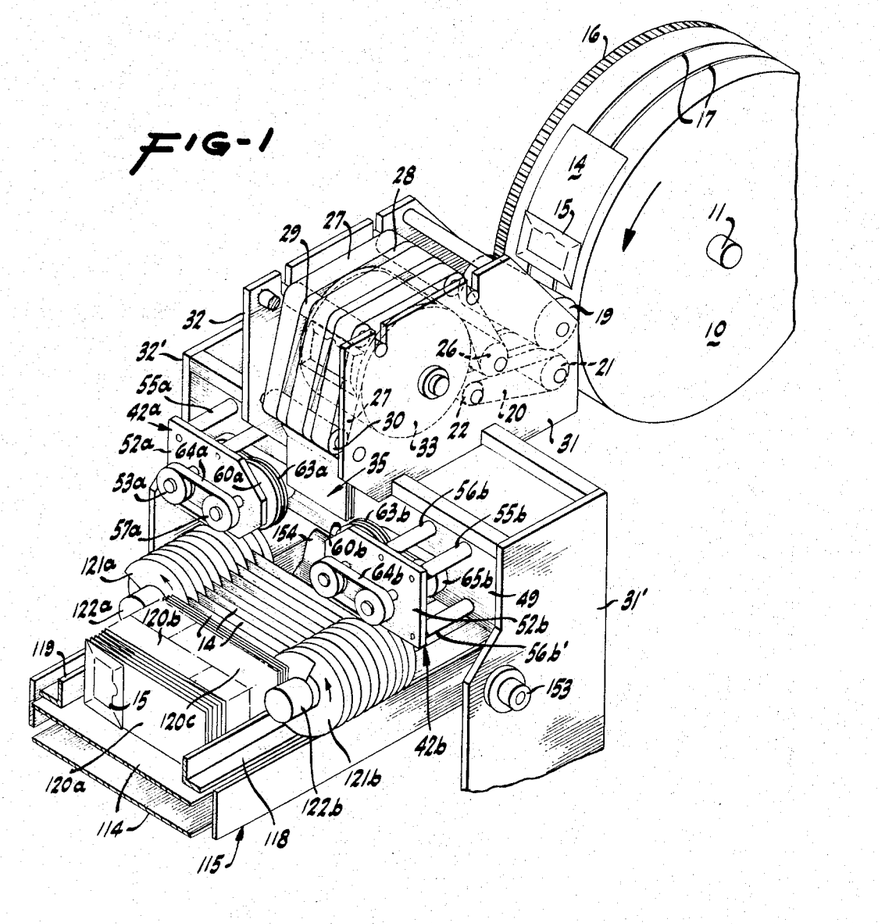
FIGURE 1 is a broken perspective view of a collator apparatus embodying the invention, the collator being shown in association with a bag-making machine.
Figure 2:
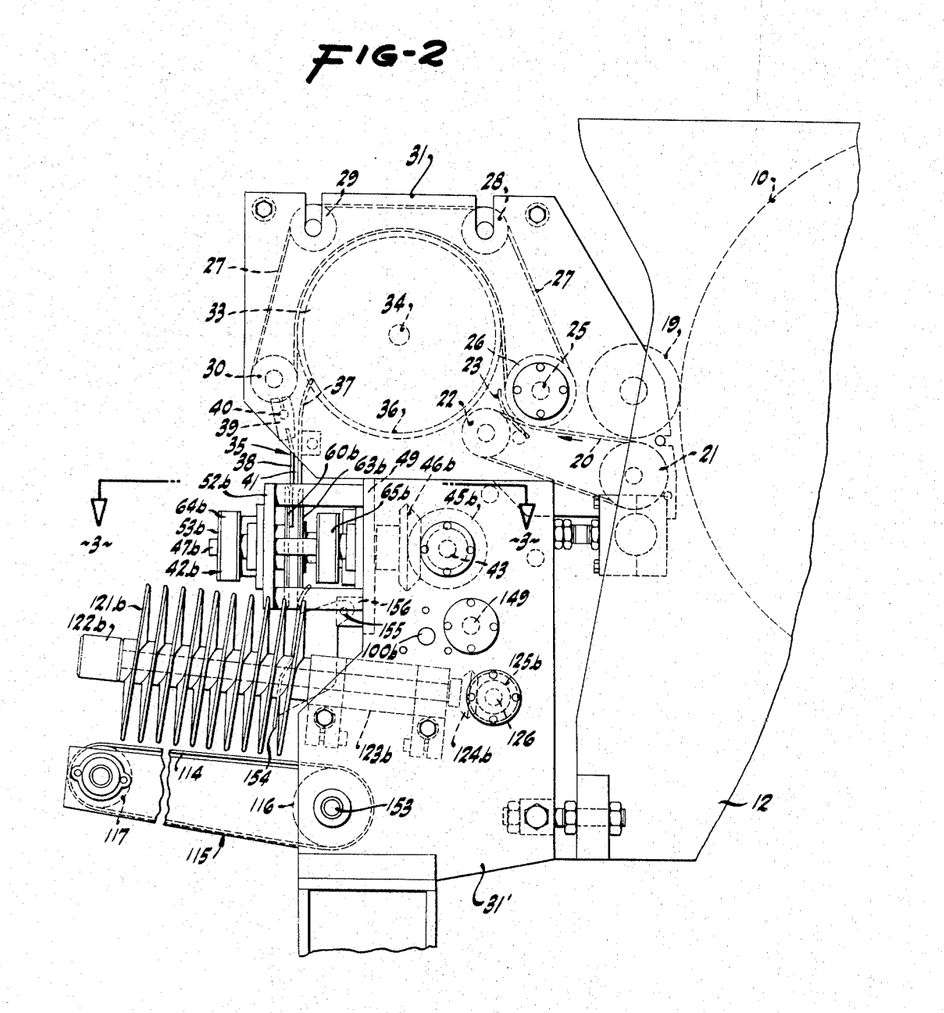
FIGURE 2 is an enlarged, side view in elevation of the collator apparatus.

The improved article collating apparatus is shown in FIGURES 1 and 2 in association with a bag-making machine that may be completely conventional, and in this respect includes a cylinder or drum 10 equipped with a shaft or axle 11 journalled for rotation in upright frame elements, one of which is shown in FIGURE 2 and is denoted with the numeral 12. The drum 10 is continuously rotated in the customary manner by drive mechanism (not shown) provided for this purpose; and as viewed in FIGURES 1 and 2, the drum rotates in a counter-clockwise direction to sequentially advance a succession of bags 14 into a discharge or transfer station. The bag 14 is a self-opening paper grocery bag of customary design having an open top and a closed bottom 15 partially folded over a side wall of the bag, with the result that the bag is thicker thereat. The bag drum 10 has a drive gear 16 positioned therealong which is secured to the shaft 11 so as to rotate therewith, and the collating apparatus is driven from and by the gear 16, as will be described in detail hereinafter.

To facilitate removal of the bags 14 from the drum 10 (the bags being secured thereto by clamp members, not shown), the drum is provided with a plurality of circumferential grooves or channels 17 into which project stripper fingers 18. The strippers 18 are respectively associated with the grooves 17, and are effective to displace each bag 14 from the surface of the drum and guide the bag outwardly therefrom and into the bite defined by a presser roll 19 and a belt conveyor 20. In the usual instance, the belt conveyor 20 comprises a plurality of relatively narrow belts that are spaced apart transversely, and such belts are respectively entrained about sheaves or pulley wheels 21 and 22.

The conveyor belts 20 move in the direction shown by the arrow in FIGURE 2, and each bag is advanced thereby toward the left and into engagement with a plurality of guides 23 which are respectively disposed intermediate the adjacent belts 20 and extend both therebelow and thereabove. The guides 23 are effective to engage each bag being advanced by the belts 20, remove the bag therefrom, and guide the same upwardly from the belts.

Disposed above the belts 20 is a shaft 25 having mounted thereon a plurality of transversely spaced pulley wheels or sheaves 26 which have a plurality of conveyor belts 27 respectively entrained thereabout. The belts 27 effectively cooperate with the belts 20 and guides 23 to further advance each bag and to enforce movement thereof along the guides 23. The belts 27 pass over a plurality of idler pulleys 28, 29 and 30, each of which is equipped with a shaft journalled for rotation in a pair of upwardly extending frame plates 31 and 32 provided by the collator apparatus.

The belts 27 also pass over and frictionally engage a pressing roll 33 of relatively large diameter which is equipped with a shaft 34 journalled for rotation in the frame plates 31 and 32. Successive bags advanced toward the left by the belt conveyor 20 in cooperation with the presser roll 19 are directed upwardly by the guides 23 and into the bite defined between the cylindrical surface of the pressing roll 33 and the belts 27, and are advanced in a counter-clockwise direction toward a stripper-guide structure generally designated 35. The various belts 20 and 27 are toothed belts, as are the sheaves and pulley wheels respectively associated therewith, to enforce proper timing and registration of the bags being advanced to the collating discs.

The pressing roll 33, in cooperation with the belts 27, not only advances successive bags toward the stripper-guide structure 35, but it removes air from each bag to tightly collapse the same (the bags are advanced with the closed bottoms thereof leading), and also holds the bottom of each bag under compression to afford time for the adhesive to set which is used for closing the bag bottoms.

In order to positively remove each bag from the pressing roll 33, such roll is provided with a plurality of transversely spaced and circumferentially extending grooves or recesses 36 therein which respectively receive a plurality of stripper fingers 37 that comprise a part of the stripper-guide structure 35. The stripper fingers 37 are fixedly carried by the frame plates 31 and 32, and spaced forwardly thereof in respective alignment therewith are a plurality of guide members 38 which at their upper end are secured to a mounting block 39 supported with respect to the frame plates 31 and 32 on a shaft 40. The mounting block 39 may be a segmented element, as illustrated, and can be clamped on the shaft 40 in any position of adjustment by set screws.

Figure 3:
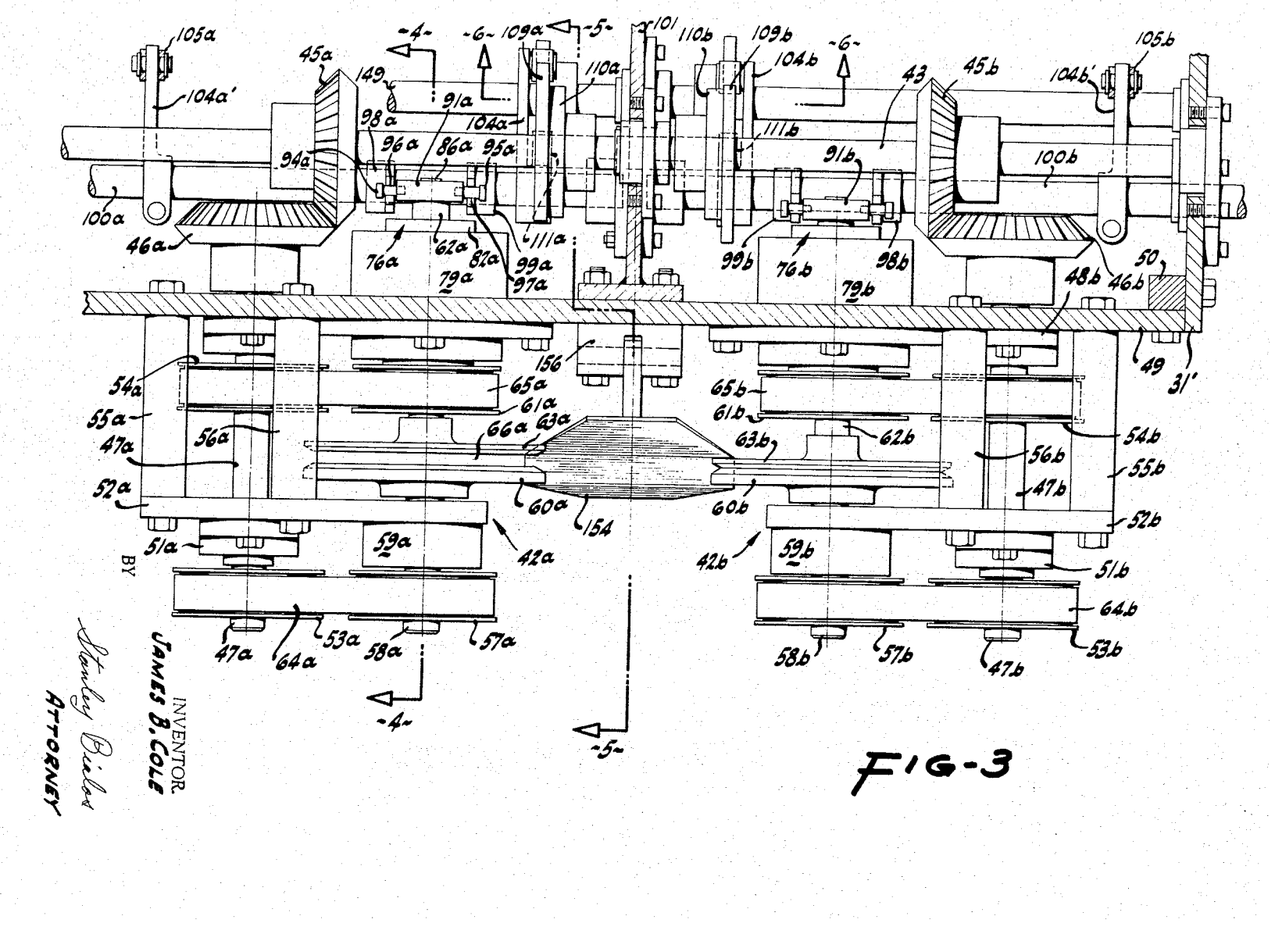
FIGURE 3 is a longitudinal sectional view taken along the line 3—3 of FIGURE 2.

The guides 38 and stripper fingers 37 define a channel 41 therebetween through which the successive bags pass in being advanced to the collating mechanisms which are generally designated in FIGURES 1 and 3 with the numerals 42a and 42b. The stripper fingers 37 and guides 38 are elongated and extend downwardly between the two collating mechanisms 42a and 42b to a location generally adjacent the center lines thereof. Thus, each bag 14 (at its lower end portion) is firmly in the control of one or the other of the collating mechanisms before it leaves the stripper-guide structure.

The collator mechanisms 42a and 42b are structurally identical and differ from each other only in the sense that they rotate in opposite directions. In this respect, and as viewed in FIGURE 1, the collator 42a rotates in a clockwise direction and the collator 42b in a counter-clockwise direction. Since the two collator mechanisms are otherwise the same, only the collator mechanism 42a will be described in detail—with particular reference to FIGURES 3 and 4—and, where appropriate, the numerals employed to designate the various components of such mechanism 42a will be applied to the corresponding components of the mechanism 42a and will be differentiated by the suffix b.

A main drive shaft 43 is common to the two collator mechanisms 42a and 42b, and it is journalled for rotation at opposite ends thereof in the frame plates 31' and 32'. The shaft 43 at the end thereof adjacent the frame plate 32' (not shown, FIGURE 3) is equipped with a gear 44 (FIGURE 5) that is rotatably driven, as will be described hereinafter, and in turn rotatably drives the shaft 43. Considering particularly the mechanism 42a, the shaft 43 is equipped with a bevel gear 45a which meshes with a bevel gear 46a carried by a shaft 47a rotatably supported by bearing structure which is carried by a frame member 48a bolted or otherwise mounted upon a transversely extending frame element 49 that is secured at opposite ends thereof by bracket elements 50 to the respective frame plates 31' and 32'. The shaft 47a is further rotatably supported by bearing structure 51a carried by a plate or bracket 52a.

Figure 4:
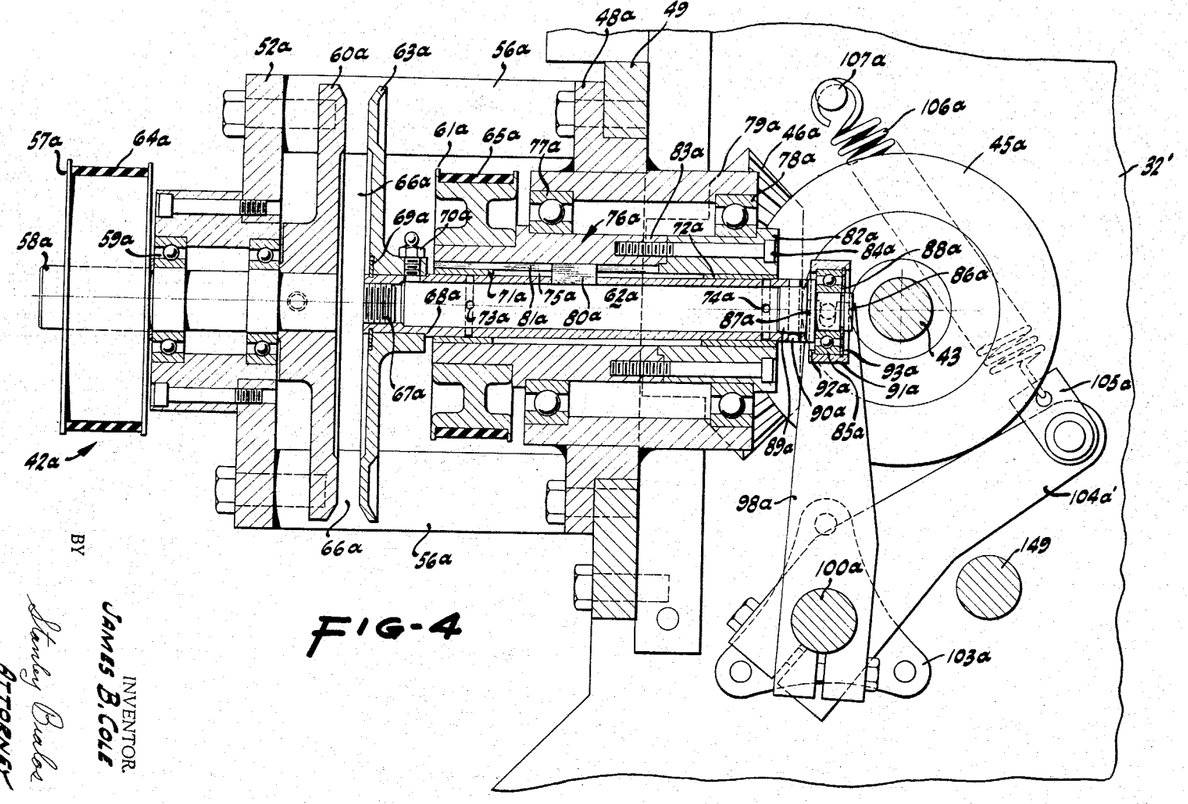
FIGURE 4 is a transverse sectional view taken generally along the line 4—4 of FIGURE 3.

The shaft 47a at the outer end thereof adjacent the bearing 51a is equipped with an outer drive pulley 53a, and is similarly equipped with an inner drive pulley 54a located intermediate the frame element 49 and the support plate 52a. The support plate 52a is rigidly related to the frame element 49 by upper spacers 55a and 56a and corresponding lower spacers, one of which is shown in FIGURE 4 and is designated with the numeral 56a'. All of such spacers are connected by cap screws to the frame member 49 and support plate 52a. The drive pulley 53a is aligned with a driven pulley or sheave 57a that is locked upon a shaft 58a journalled for rotation in bearing structure 59a that is carried by the frame plate 52a. The shaft 58a at the opposite end thereof along the frame plate 52a is equipped with a collator disc 60a.

In a corresponding manner, the drive pulley 54a has a driven pulley wheel 61a aligned therewith which is mounted upon a shaft 62a equipped with a collating disc 63a disposed in facing relation with the collating disc 60a. The shaft 62a is rotatably supported in a manner to be described subsequently, and the paired pulley wheels 53a and 57a are drivingly interconnected by a belt 64a, and the paired pulley wheels 54a and 61a are drivingly interconnected by a belt 65a. Quite evidently, rotation of the shaft 43 will rotate the shaft 47a because of the driving connection therewith defined by the bevel gears 45a and 46a; and necessarily then, the pulley wheels 53a and 54a will be rotated, and such wheels will in turn respectively rotate the pulley wheels 57a and 61a through the associated belts 64a and 65a. Thus, the paired collating discs 60a and 63a are rotated continuously whenever the shaft 43 is driven.

Figure 9:
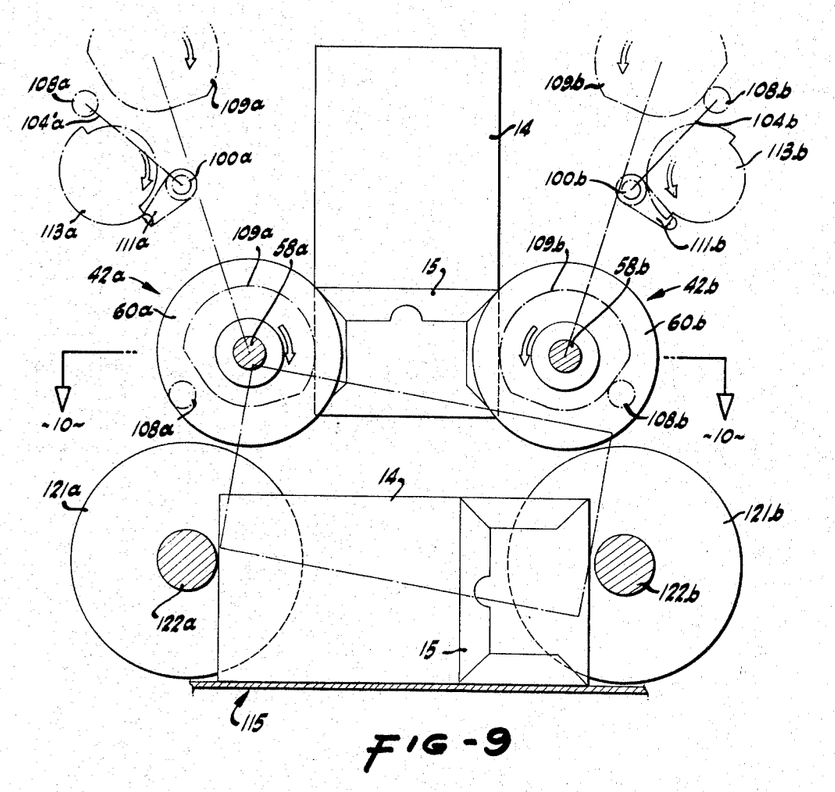
FIGURE 9 is a diagrammatic view showing the operation of the collator discs and cam control thereof.

The collating discs 60a and 63a are movable between open and closed positions, and in the open position thereof illustrated in FIGURE 3, a space 66a is defined between the facing discs which is sufficiently wide that a bag 14 can pass freely therebetween. In the closed position of the discs (the closed position being illustrated by the discs 60b and 63b in FIGURE 3), they are adapted to tightly grip a bag 14 disposed therebetween and rotate the same from a generally vertical orientation toward a horizontal position, as indicated in FIGURE 9. The structural composition enabling movement of the inner disc 63a between the open and closed positions thereof is illustrated in FIGURE 4, to which reference will now be made in particular in describing such composition.

The shaft 62a is a hollow tubular component having a plug 67a closing one end thereof. Mounted upon the shaft at the end containing such plug is the inner collating disc 63a which is constrained against axial movement in one direction along the shaft by abutment with an annular shoulder 68a defined thereon, and in the opposite axial direction by a snap ring 69a. Relative rotational movement between the shaft 62a and collator disc 63a may be prevented in any suitable manner, as by means of a set screw (not shown), and in the structure illustrated, a grease fitting 70a provides sufficient constraint for this purpose in that it passes through the hub of the disc and into an opening provided therefor in the shaft.

Circumjacent the shaft 62a adjacent the end portions thereof are a pair of cylindrical bearing sleeves 71a and 72a, and such bearings support the shaft for reciprocable displacements along the longitudinal axis thereof between positions corresponding to the aforementioned open and closed positions of the collator discs. To facilitate such displacements of the shaft, a viscous lubricant such as grease is admitted into the interior of the shaft through the fitting 70a, and lubricates the inner surface of the bearing 71a through a plurality of apertures 73a and the bearing 72a through a plurality of apertures 74a. The bearings 71a and 72a are mounted within the interior of an axially extending bore or passage 75a defined by a housing 76a supported for rotational movement by bearings 77a and 78a which are mounted within a stationary support collar 79a welded or otherwise rigidly affixed to the frame plate 48a.

The driven sheave or pulley wheel 61a is mounted upon the housing 76a in a manner preventing relative movement therebetween, as by means of a press fit. Accordingly, whenever the pulley wheel 61a is rotated through its connection with the belt 65a, the housing 76a is correspondingly rotated. The shaft 62a is then rotatably driven by the housing 76a because of its interconnection therewith through a key 80a that is pressed into an opening provided therefor in the shaft and seats within a keyway 81a defined by the housing 76a within the bore or passage 75a thereof. Although the shaft 62a is rotatably driven by the housing 76a through the key 80a, the shaft is axially displaceable relative to the housing because the key is free to slide along the keyway 81a within the dimensional limits defined in one direction by the bearing 71a and in the opposite direction by an abutment surface formed by a collar 82a that provides a part of the housing 76a and is secured to the main body component 83a thereof by a plurality of cap screws 84a. The segmented character of the housing 76a permits assembly thereof, particularly with the bearings 77a and 78a and collar 79a.

Reciprocable displacements are enforced on the shaft 62a through a thrust bearing composition that includes a ball bearing assembly 85a mounted upon the outer end of a plug or shaft extension 86a. The ball bearing assembly 85a is constrained against movement relative to the shaft extension in one direction by a shoulder 87a provided thereby and in the opposite direction by a snap ring 88a. The shaft extension 86a extends into and closes the inner end portion of the hollow shaft 62a, as shown at 89a, and is fixedly related thereto by a pin 90a extending through both the shaft and shaft extension.

As seen in FIGURE 4, it is the inner race of the bearing assembly 85a that is actually secured to the shaft extension 86a through the shoulder 87a and snap ring 88a, and the outer race of the bearing assembly is secured to a collar 91a and is constrained against displacement in axial directions with respect thereto in one direction by a shoulder 92a provided by the collar and in the opposite direction by a snap ring 93a. Clearly then, force applied to the collar 91a in either axial direction (i.e., along the shaft 62a) will be transmitted to such shaft through the bearing assembly 85a and shaft extension 86a and will result in displacement of the shaft relative to the housing 76a.

The collar 91a is equipped with a pair of pins in the form of screws 94a and 95a which at their inner ends are threaded and extend into tapped openings provided therefor in the collar. At their outer ends, the pins are enlarged somewhat in diameter and have smooth cylindrical surfaces, and they respectively ride in open, generally U-shaped channels 96a and 97a provided by a pair of thrust arms 98a and 99a, each of which is mounted upon and clamped at its lower end to a thrust or pivot shaft 100a so as to pivot therewith. The shaft 100a is supported for angular displacements by suitable bearing assemblies, one of which is provided by an inner frame divider 101 bolted or otherwise rigidly secured to the frame element 49, and the other bearing is provided by the outer frame plate 32'. The latter bearing assembly is indicated generally in FIGURE 4 and for identification is denoted with the numeral 103a.

The shaft 100a is resiliently biased in a counterclockwise direction, as viewed in FIGURE 4, with the result that the shaft 62a is urged toward the left so as to displace the collating disc 63a toward the closed position thereof in which it is resiliently forced into engagement with the collating disc 60a, assuming that a bag 14 is not interposed between the two discs. Such resilient biasing force is applied to the shaft 100a through a spring arm 104a' clamped to the shaft 100a so that relative rotation therebetween is prevented. The arm 104a' is provided at its outer end with a strap 105a to which is secured a tension spring 106a at one end thereof. The spring 106a at its opposite end is secured to a pin 107a provided by the outer frame plate 32'. Accordingly, the end of the spring which is secured to the pin 107a is fixed, and since the spring is stressed, it applies a resilient force to the arm 104a' which biases it and the shaft 100a in a counterclockwise direction, as viewed in FIGURE 4.

Also secured to the shaft 100a so as to be angularly displaced thereby is a control arm 104a equipped adjacent the outer free end thereof with a cam follower 108a that rides upon and is urged into engagement with the peripheral surface of a cam 109a secured to a mounting plate 110a fixedly mounted upon the aforementioned main shaft 43. The configuration of the cam 109a is such that the arm 104a is repetitively and cyclicly reciprocated thereby (against the biasing force of the spring 106a) in a direction to displace the collator disc 63a into the open position thereof, illustrated in FIGURE 4, whenever the collating mechanism 42a is controlling the collation operation. The rate of cyclic displacement of the shaft 62a corresponds on a bag-by-bag basis to the rate of delivery of bags by the bag making machine and drum 10 thereof. That is to say, the cam 109a makes one complete revolution for each bag advanced into the collating mechanisms 42a and 42b from the stripper-guide structure 35. In a corresponding manner, the shaft 62a and collating disc 63a will be axially displaced between open and closed positions for each cycle of rotation of the cam 109a, provided that the collating mechanism 42a is in control of a collating operation.

In this respect, if the collating discs 60a and 63a are maintained in the open positions thereof so that the space 66a is continuously defined therebetween, such collating discs would be unable to control the movement of the bags 14 advancing downwardly theretoward from the stripper-guide structure 35. In the particular apparatus illustrated, which of the collating mechanisms 42a or 42b controls the movement of bags 14 is determined by maintaining, for a predetermined period, one or the other of the paired collating discs in their open positions.

Figure 5:
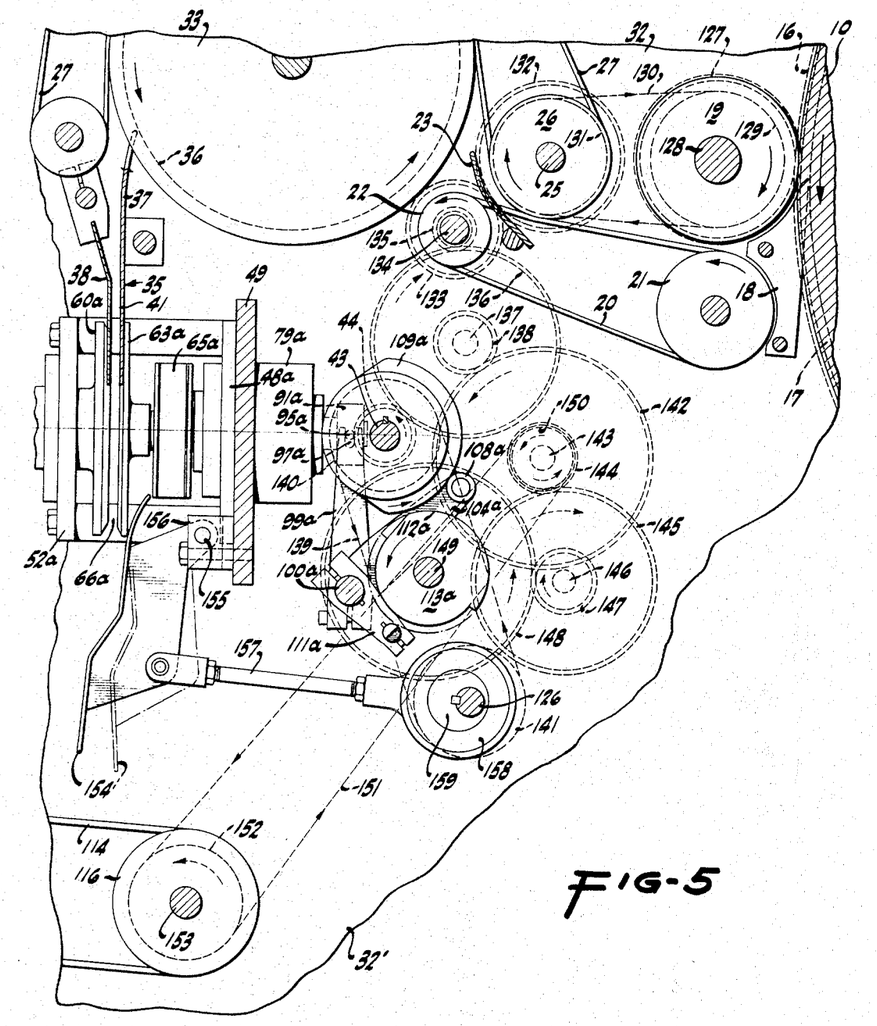
FIGURE 5 is a transverse sectional view taken generally along the line 5—5 of FIGURE 3.

The mechanism by which this is accomplished is illustrated most clearly in FIGURE 5 and includes a cam arm 111a clamped to the shaft 100a and adapted to ride upon a raised surface portion or segment 112a of a cycling cam 113a. It will be apparent that when the raised surface portion 112a, which has an angular length of approximately 180°, is rotated into engagement with the cam arm 111a, such arm will be displaced in a clockwise direction, as viewed in FIGURE 5, whereupon the shaft 100a will be similarly displaced along with the arm 104a and cam follower 108a carried thereby. Accordingly, the cam follower 108a will no longer ridingly engage the cam 109a and will not be controlled thereby. Thus, the thrust arms 98a and 99a will be displaced toward the right, as viewed in FIGURE 5 (that is, in a clockwise direction) and the shaft 62a and cam disc 63a will be displaced into the open position thereof shown in FIGURE 4.

The cam 109a, as indicated hereinbefore, makes one revolution per bag and, when it is in control, reciprocates the cam disc 63a from open to closed to open positions per cam revolution to process each bag discharged downwardly through the stripper-guide structure 35. The cycling cam 113a, however, makes one revolution for a predetermined number of bags (for example, 100 bags) and, therefore, during each complete revolution thereof, it locks out or makes the collator mechanism 42a inoperative for a total of 50 bags by removing the collator disc 63a from control of the cam 109a, and for the next 50 bags, the cycling cam permits the cam 109a to control the collator disc 63a.

The collating mechanisms 42a and 42b are alternately operative to grip each bag and rotate the same from a vertical orientation into a generally horizontal position as shown in FIGURE 9. In the particular apparatus being considered, the collator mechanisms are operative to positively rotate each bag through approximately 80° from a vertical position toward a horizontal position and then release the bag, whereupon the angular momentum thereof carries the bag into a horizontal position the limit of which is defined by the conveyor belt 114 of a discharge conveyor generally designated with the numeral 115. As shown most clearly in FIGURE 2, the conveyor belt 114 (which may be one relatively wide belt as shown, or a plurality of relatively narrow, transversely spaced belts) is entrained about a drive pulley 116 and an idler pulley 117, and is continuously moving because of the drive connection thereto which will be described in detail hereinafter. The discharge conveyor 115 may be equipped with a pair of guide rails 118 and 119 which are disposed above the upper reach of the conveyor belt 114 and define the path of travel of the bags being advanced toward a packaging or banding station by the belt 114.

As shown in FIGURE 1, the bags 14 are collated into groups each of which comprises a predetermined number of bags as, for example, a group of 50 bags. For purposes of specific identification, the various bag groups shown in FIGURE 1 are respectively designated with the numerals 120a, 120b, 120c; and each of the bags is in contiguous relation with those immediately preceding and following the same so that a compact mass of collated bags is advanced by the discharge conveyor. It is evident that the bottoms of the bags comprising the groups 120a and 120c are oriented along the left-hand side of the conveyor, and those of the bags comprising the group 120b are oriented along the right-hand side of the conveyor. Thus, the groups 120a and 120c were collated by the collator mechanism 42a, and the group 120b was collated by the mechanism 42b. Each bag, in being gripped and rotated by one or the other of the collator mechanisms, is released into the helical flights of a pair of transversely spaced spiral worms or conveyor elements 121a and 121b. The pitch of the spiral conveyor elements is oriented along the length thereof so as to positively advance each bag outwardly from the collating mechanisms 42a and 42b.

The spiral conveyors 121a and 121b are essentially the same in a structural and functional sense, and are cooperatively effective to positively advance bags 14 outwardly along the discharge conveyor 115. In the particular structure shown, the spiral conveyors rotate in the same direction (counter-clockwise) since the pitch directions of the two helices are reversely oriented. The spiral flights of the conveyor 121a are carried by a shaft 122a and, similarly, the spiral flights of the conveyor 121b are carried by a shaft 122b; and referring to FIGURE 2, it will be seen that the shaft 122b is rotatably carried by a bearing-support structure, generally denoted 123b, rigidly related to the frame components of the apparatus.

The shaft 122b extends through the support structure 123b, and at its inner end, is equipped with a bevel gear 124b drivingly engaged by a bevel gear 125b mounted upon a shaft 126 that is journalled for rotation in the frame plates 31' and 32' and is, therefore, common to and drives both of the spiral conveyors 121a and 121b. Accordingly, the shaft 122a of the spiral conveyor 121a will be equipped with a bevel gear (not shown) which is driven by a second bevel gear (also not shown) mounted upon the shaft 126. Th shaft 126 is continuously rotated whenever the collator apparatus is in operation through a gear train that is illustrated in FIGURE 5 and which will now be described.

Such gear train, as shown in FIGURE 5, is located exteriorly of the frame plates 32 and 32' and, therefore, is shown by phatom lines in this figure. As indicated hereinbefore, the entire collator apparatus is driven by the bull gear 16 that comprises a part of the bag making apparatus and, in particular, is affixed to the bag drum 10 or shaft 11 thereof. The gear 16 engages and therefore drives, in a clockwise direction, a gear 127 mounted upon a shaft 128 that carries the aforementioned presser roll 19. Also common to the shaft 128 is a sprocket 129 having a chain 130 entrained thereabout that also is entrained about a sprocket 131 mounted upon the shaft 25. The sprocket 131 rotates the pulley wheels 26 which are common to the shaft 25, and therefore drives the various conveyor belts 27 which are respectively associated with the pulley wheels 26.

A gear 132 is also mounted upon the shaft 25 so as to rotate therewith, and such gear drivingly engages a gear 133 mounted upon a shaft 134 that carries the pulley wheels 22. Thus, the conveyor belts 20 are driven because of their connection with the respective pulley wheels 22. The shaft 134 also has mounted thereon a gear 135 that drivingly engages an idler 136 mounted upon a shaft 137 which carries a smaller gear 138. The idler gear 136 drivingly engages the aforementioned gear 44 that is mounted upon the shaft 43 and continuously rotates the same whenever the collator apparatus is in operation so as to continuously drive the collator mechanisms 42a and 42b.

As noted hereinbefore, the gear 44 and shaft 43 make one complete revolution for each bag advanced downwardly through the stripper-guide structure 35 toward the collating mechanisms 42a and 42b; and the shaft 126 is rotated in enforced synchronism with the shaft 43 in a one-to-one relationship through a drive chain 139 that, at one end, is entrained about a drive sprocket 140 mounted upon the shaft 43 and, at its other end, is mounted upon a sprocket 141 carried by the shaft 126. Evidently, then, since the bevel gears 124b and 125b (FIGURE 2) have essentially the same diameter, the shaft 122b rotates in a one-to-one ratio with the shafts 126 and 43.

As previously indicated, the cycling cam 113a rotates at a predetermined lesser velocity than the cam 109a (in a 1-to-100 ratio, using the aforementioned example), and this reduction in rotational velocity is accomplished through the following gear train. Returning to the shaft 137 and gear 138 mounted thereon, such gear drivingly engages a large idler gear 142 mounted upon a shaft 143 so as to rotate therewith. Also mounted upon the shaft 143 is a much smaller gear 144 that engages a relatively large idler gear 145 so as to rotate the same and also rotate a shaft 146 upon which the gear 145 is mounted. Also fixed upon the shaft 146 is a smaller gear 147 that drivingly engages a large gear 148 which is mounted upon a shaft 149 that carries the aforementioned cycling cam 113a. Thus, through the described gear train comprising the various interengaged large and small gears, the desired reduction in the velocity of the cycling cam 113a is attained.

The shaft 143 is seen to have a sprocket 150 mounted thereon, and entrained at one end about the sprocket is a drive chain 151 which, at its other end, is entrained about a sprocket 152 carried by a shaft 153 that has the aforementioned conveyor roller 116 mounted thereon. It is apparent, then, that the discharge conveyor 115 is continuously driven through the chain 151 and the rate of linear movement of the conveyor belt 114 is determined by the point of power take-off for the chain 151 which, in the particular illustration, is the shaft 143 or sprocket 150 mounted thereon.

The collator apparatus is equipped with a displacement or kicker element 154 disposed intermediate the spiral conveyors 121a and 121b. The element 154 is operative to engage each bag processed by either of the collating mechanisms 42a and 42b and urge the bag outwardly to insure operative engagement thereof with the flights of the conveyor elements 121a and 121b. In accomplishing this result, and as shown most clearly in FIGURE 5, the element 154 is pivotally displaceable about a pivot axis defined by a pin 155 between an outer position shown by full lines and the inner position illustrated by broken lines. The pin 155 is carried by a mounting bracket 156 bolted or otherwise secured to the frame element 49.

Pivotally secured to the element 154 is a pitman or connecting rod 157, the length of which can be selectively adjusted as indicated, and the pitman is operatively arranged with the shaft 126 through a crank structure defined by a collar 158 carried by the pitman and an eccentric 159 mounted upon the shaft 126 and rotatably received in an opening provided therefor in the collar 158. The eccentric 159 is keyed to the shaft 126 so as to rotate therewith, and evidently then, for each complete rotation of the shaft, the pitman 157 is reciprocated along the longitudinal axis thereof and the kicker element 154 is thereby displaced between its inner and outer positions. The kicker element 154 reciprocates in timed relation with the collator mechanisms 42a and 42b so as to engage each bag rotated into horizontal position by such mechanisms, as shown in FIGURE 9, and positively displace the same into the flights of the spiral conveyor elements 121a and 121b.

In operation of the apparatus, the bags 14 are formed in a conventional manner partly on the bag drum 10, and the completely formed and folded bags are successively discharged one by one therefrom into the bite defined by the presser roll 19 and conveyor belts 20. Each bag is displaced into the grip of the pressing roll 33 and conveyor belts 27 and is advanced thereby into the stripper-guide structure 35 which maintains each bag in a generally vertical orientation until it is gripped by one or the other of the collating mechanisms 42a and 42b. Each bag is rotated by such mechanism through substantially 90° (to a generally horizontal position) and into the helical flights of the spiral conveyor elements 121a and 121b which are operative to advance each bag outwardly at a relatively rapid rate so that it overtakes the prior-collated bags which are being displaced at a somewhat slower rate by the discharge conveyor 115. Since the rate of translational movement enforced on the collated bags by the conveyor belt 114 of the discharge conveyor 115 is somewhat less than the translational motion enforced by the spiral elements 121, the collated bags tend to define an uninterrupted juxtaposed mass thereof along the conveyor belt 114, as shown in FIGURE 1. The kicker element 154 is reciprocated between the forward and rearward positions thereof in timed relation with the movement of bags toward the spiral conveyor elements 121, and presses each such bag outwardly to assure positive engagement thereof with the flights of the spiral conveyor elements.

The apparatus is timed so that one of the collating mechanisms 42 controls the movement of a predetermined number of bags comprising a group thereof, and then the other collating mechanism controls the movement of the next predetermined number of bags to form the next successive collated group. By way of specific example and referring to FIGURE 1, the mechanism 42a grips a predetermined number, say 50, of successive bags and rotates the same in a clockwise direction so that the bottom of each such bag is located adjacent the spiral conveyor element 121a (the group 120a of bags is so oriented). Then the mechanism 42a becomes inoperative and the mechainsm 42b becomes effective to grip a corresponding number of successive bags and rotate the same in a counter-clockwise direction to dispose the bottoms thereof along the spiral conveyor element 121b (the group 120b). Such cycle of operation is then repeated with the collating mechanisms 42a and 42b alternately controlling movement of a group of bags comprising a predetermined number thereof. Thus, the bags being discharged by the conveyor 115 are organized into the collated groups 120a, 120b and 102c, etc.

In one specific apparatus, the collating mechanisms 42 are effective to grip and positively rotate each bag through an angular distance of approximately 80° and then release the same. The angular momentum thereby imparted to each bag is effective to continue the angular movement thereof after its release and into an essentially horizontal position. The angular motion of each bag is terminated by abutment thereof essentially with one or the other of the shafts 122a or 122b, depending upon the direction in which any particular bag is rotated. It will be noted that such abutment occurs at the closed bottom end 15 of a bag which end thereof is relatively heavy in that it comprises a plurality of wall thicknesses and contains a reinforcing corrugation in the form of a sharp fold line. Thus, such end is readily able to withstand the slight impact force developed thereagainst upon impact thereof with the shaft. Additionally, at about the same time such impact occurs, the bag along a longitudinal edge thereof abuts the conveyor belt 114 which further absorbs a portion of such impact force.

It will be understood from the foregoing description that two cycling cams 113 are employed in respective association with the collating mechanisms 42a and 42b. Such cycling cams are out of phase with respect to each other by substantially 180° so that one of the collating mechanisms is effective to control movement of the bags and thereby collate the same, while the other mechanism is locked out—that is, the collating discs 60 and 63 thereof are continuously maintained in spaced apart relation. Further, at the instant that one of the collating mechanisms is made operative, the other becomes inoperative, and it may be noted that each cycling cam 113 at the terminal ends of the raised surface portion 112 thereof, has sharp radially disposed edges enabling rapid transition from the inoperative to the operative state, and vice versa.

Figure 6:
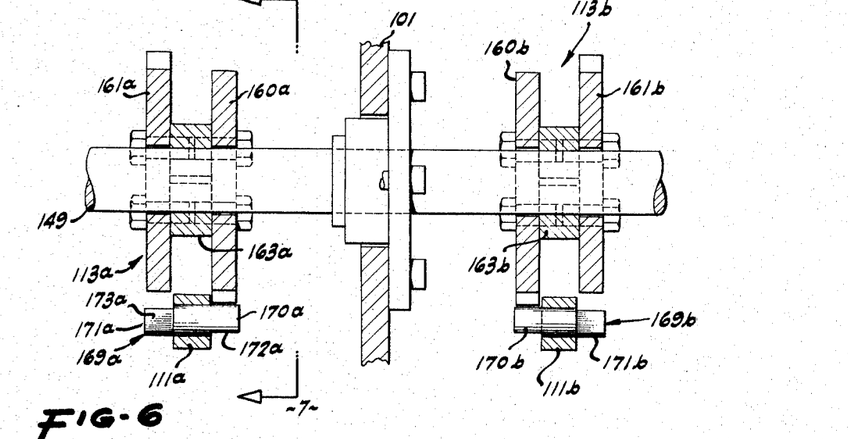
FIGURE 6 is a broken transverse sectional view taken generally along the line 6—6 of FIGURE 3.

More particularly, and as illustrated most clearly in FIGURE 6, the two cycling or lock-out cams 113a and 113b are each mounted upon the shaft 149 so as to be rotatably driven thereby. Accordingly, the two cams are rotated simultaneously and in the same angular direction and are angularly displaced with respect to each other by 180°. Consequently, since the cams have essentially the same shape or configuration, the two collating mechanisms 42a and 42b operate in opposite phase relationship. The details of the construction of each cam will be considered with respect to the cam 113a and with reference to FIGURES 6 and 7 in particular; and because the two cams are essentially identical, the same reference numerals will be used in conjunction with the cam 113b except that the suffix "b" will be added to each such numeral instead of the suffix "a."

The cycling or lock-out cam 113a comprises a plurality of components including a pair of plates or sections 160a and 161a which are spaced apart axially along the shaft 149. The two plates are fixedly secured, as by means of cap screws 162a, to a hub 163a interposed therebetween which is clamped to the shaft 149 so as to rotate therewith. For this purpose, the hub 163a may be partially split as shown in FIGURE 7, and clamped into tight frictional engagement with the shaft by means of a bolt 164a.

The cam plates 160a and 161a are substantially identical although inverted with respect to each other, and the major diameters of the two cam plates together constitute or define the aforementioned raised surface portion or segment 112a of the cam 113a. Such major diameter or raised surface portion 112a has an arcuate length that is accurately determined to be 180°, and the major diameter of each of the two cam plates or cam halves is made somewhat less than 180° (approximately 150° in the apparatus under consideration). In this respect, the major diameter of each cam plate trails off at one end thereof, as shown at 165a with respect to the plate 160a, and at 166a with respect to the plate 161a. The opposite ends of the major diameter of each cam plate respectively constitute one of the aforementioned sharp radially disposed edges, and for purposes of specific identification, such edges are respectively denoted as 167a for the cam plate 160a, and 168a for the cam plate 161a.

Figure 8:
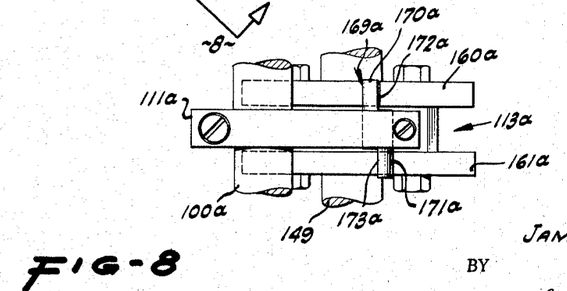
FIGURE 8 is a broken sectional view taken along the line 8—8 of FIGURE 7.

As indicated hereinbefore, the two cam plates or cam halves 160a and 161a are angularly adjusted relative to each other so that the sharp radially disposed edges 167a and 168a lie on or define a diameter through the cycling cam 113a, wherefor such sharp edges are spaced apart by 180°. Adapted to engage the raised segment or major diameter of the cam 113a is a cam follower 169a which extends through and is carried by the cam arm 111a. As shown most clearly in FIGURE 8, the cam follower is provided with outwardly extending pins or cam riders 170a and 171a which are respectively associated with the cam plates 160a and 161a. The pins 170a and 171a are shaped so that each constitutes one-half the total cross-sectional area of the central portion of the cam follower and, therefore, each pin is semi-cylindrical in cross-section. Also, the pins are angularly off-set from each other by 180° so that the planar surfaces 172a and 173a thereof are oriented in facing opposition and together define a plane. Such planar surfaces of the pins respectively cooperate with the sharp radially disposed edges 167a and 168a of the two cam plates to permit rapid transitions between the active and lock-out positions of the cam arm 111a.

Figure 7:
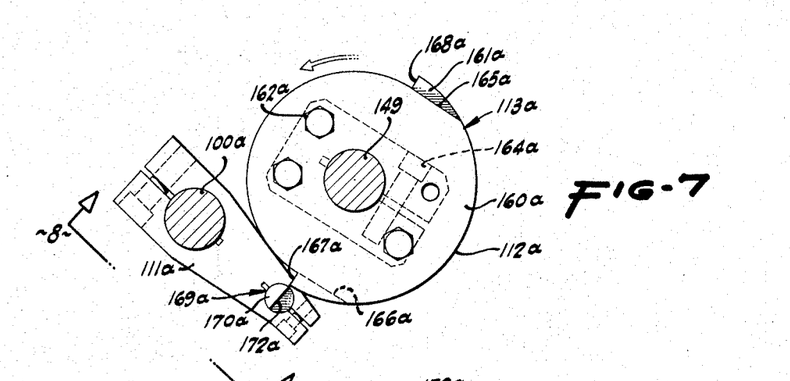
FIGURE 7 is a broken sectional view taken along the line 7—7 of FIGURE 6.

In this respect, and referring to FIGURE 7, the cam assembly 113a rotates in a counter-clockwise direction and in the relative position of the components as illustrated in this figure, the sharp edge 167a has been advanced into a position in which it is in substantial alignment with and is about to be displaced from the planar surface 172a of the pin 170a. At about the instant that such alignment of the edge 167a and surface 172a occurs, the arm 111a is freed thereby of the constraint previously applied by the cam assembly 113a and can reciprocate about the axis of the shaft 100a in accordance with the angular motion imparted thereto by the cam 109a. Such freedom of the cam 111a to reciprocate is maintained as the cam assembly 113a continues to rotate in a counter-clockwise direction through an angular distance of substantially 180°.

At the time that the cam assembly has rotated through such angular distance of 180°, the edge 168a of the plate 161a has been advanced to a position in which it is in substantial alignment with and in a sense forms a continuation of the planar surface 173a of the pin 171a. At the instant such alignment occurs, the pin 171a is constrained by the major diameter portion of the cam plate 161a against inward angular displacement with the result that the arm 111a is then locked out and the collating mechanism 42a is constrained in the idling condition thereof. Evidently, such transition from an active to an inactive or lock-out position is quite rapid since it requires only a very slight movement of the cam plate to effect the same.

As the cam 113a continues to rotate in a counterclockwise direction until it has traversed an angular distance of about 150°, the surface portion 166a will come into alignment with the pin 171a, whereupon the pin and cam arm 111a could be displaced inwardly if it were not otherwise constrained against such movement. Constraint is applied, however, because at this same time the major diameter of the cam plate 160a is in engagement with the pin 170a and the major diameter of the cam plate 160a does not trail off at this location. Consequently, the constraint against inward angular displacement of the cam arm 111a is effectively transferred from control of the pin 171a to control of the pin 170a. As the cycling cam continues to rotate in the clockwise direction, the sharp radially disposed edge 167a of the cam plate 160a is advanced toward a position of alignment with the planar surface 172a of the cam 170a, and when such position of alignment occurs, the pin and cam arm 111a are immediately released for angular displacement and a substantially instantaneous transition is thereby permitted from the lock-out to operative condition since only a very slight movement of the cam assembly is necessary to effect the same.

Referring to FIGURE 9 which is essentially diagrammatic and illustrates the cams 109 and cam followers 108 overlaid on the collating discs and further depicts such cams and followers in phantom form in relation to the cams 113 and cam arms 111 (also, for convenience of illustration the "a" and "b" cams are shown as rotating in opposite directions which is not the case in the actual structure), the collating discs of the mechanism 42b have just closed into gripping engagement with a bag 14 because the cam follower 108b has ridden off of the large-diameter portion of the cam 109b and is substantially in engagement with the small-diameter portion thereof. Therefore, the discs of the collating mechanism 42b are gripping the bag 14 and will rotate the same into the intermediate position, illustrated by dot and dash lines, which corresponds to an angular distance of approximately 80° from the vertical.

At the same time that the cam 109b, bag 14 and collating discs have rotated through such angular distance, the cam follower 108b will have started to ascend the rise along the cam and will have progressed to a position substantially equivalent in radial extent (with respect to the axis of rotation of the cam) to the closing position illustrated in FIGURE 9 in which the collating discs 60b and 63b have just closed into gripping engagement with the bag. Consequently, the collating discs 60b and 63b will be moving then toward the open position thereof and will thereafter be maintained in a completely open position while the cam 109b moves through the subsequent angular distance which is somewhat in excess of 180°.

If at this time the bag 14 being rotated by the collating mechanism 42b constitutes the final (50th) bag of a collated group, the radially enlarged surface of the cam 113b will be moving into engagement with the cam arm 111b (the lock-out relationship is essentially illustrated in FIGURE 9 by the cam 113a and cam arm 111a). The collating discs 60b and 63b at this time are in the open position thereof and will continue to be maintained in such position for a relatively long period (i.e., as the cam 109b rotates through an angular distance in excess of 180°). Accordingly, the cam 113b will only have to move a sufficient angular distance during such relatively long period to bring the large-diameter section into abutment with the cam arm so as thereafter to prevent inward movement thereof when the cam 109b is again rotated into the position shown in FIGURE 9. Thus, each cycling cam in association with its cam arm is in the nature of a stop which simply constrains the cam arm (and collating disc 63 operatively connected therewith) from being displaced under the biasing force of the associated spring 106, such constraint being indicated in FIGURE 9 by the relationship of the cam 113a and arm 111a, and cam 109a and cam follower 108a.

When one of the collating mechanisms is inoperative, or in the idling condition thereof, the other mechanism is under control of its displacement cam 109 because the cam follower 108 is then permitted to continuously engage such cam. That is to say (consider the mechanism 42a illustrated in FIGURE 4), when the cam arm 111a is generally aligned with the reduced diameter section of the cycling cam 113a, the spacing then between such section of the cam and cam arm permits the spring 106a to rotate the spring arm 104a' and shaft 100a to which it is attached in a counter-clockwise direction until the cam follower 108a abuts the surface of the cam 109a.

Accordingly, the arm 104a (and spring arm 104a') is then repetitively displaced in opposite angular directions about the axis defined by the shaft 100a in accordance with the shape of the cam 109a and rotational velocity thereof. Corresponding angular displacements are therefore enforced upon the arms 98a and 99a because of their connection with the shaft 100a, and the shaft 62a of the collating mechanism is necessarily reciprocated along the longitudinal axis thereof in timed relation with the angular movements of the arms 98a and 99a as a consequence of the connection of such arms with the shaft. Thus, the collating disc 63a is cyclicly displaced between the open and closed positions thereof.

The disc 63a is positively displaced toward the open position thereof because of the effectively rigid mechanical linkage defined by engagement of the raised portion of the cam 109a with the cam follower 108a. On the other hand, the disc 63a is resiliently or yieldably urged in the opposite direction toward the closed position thereof by the spring 106a. Therefore, movement of the disc 63a toward the maximum or completely closed position thereof, which is determined by abutment of the disc with the facing outer disc 60a, can be interrupted by interposition of a bag in the space 66a defined between the facing discs 60a and 63a. Accordingly, any such bag so interposed between the discs is resiliently clamped thereby with a tight frictional grip.

Figure 10:
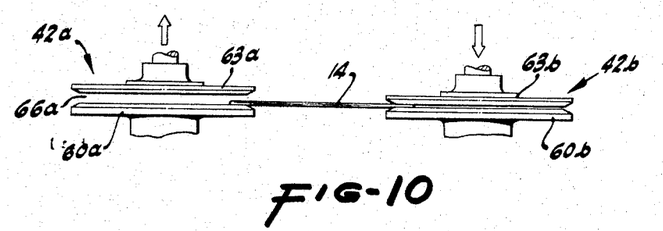
FIGURE 10 is a transverse sectional view taken on the line 10—10 of FIGURE 9.

As seen best in FIGURE 10, the space 66a is sufficiently wide that a bag 14 can freely move therethrough without interference from the facing collating discs 60 and 63 provided that such bag is properly aligned with the space. In the structure being considered, the paired collating discs 60a and 63a are aligned transversely with the correspondingly paired discs 60b and 63b. Consequently, when a bag 14 is gripped by one pair of collating discs, such bag is necessarily aligned with the space 66 defined between the opposite pair of discs which, at such time, must be open. Therefore, rotation of the operative bag-gripping discs causes the bag to traverse a path of travel defined in part by the space 66 provided between the opposite pair of locked out or idling discs. The bag is free to move through such space 66 since there are no intervening elements or obstructions disposed therein which would interfere with or otherwise impede free movement of the bag therethrough.

The collating discs 60 and 63 of each of the mechanisms 42a and 42b are continuously rotated whenever the collating apparatus is in operation. Thus, the only time relationship that must be established between the two pairs of collating discs is that of making one pair operative while the other pair is maintained in the spaced apart, inoperative or idling condition thereof, as heretofore described. Moreover, only a simple motion need be imparted to each pair of collating discs; namely, movement thereof between open and closed positions. More particularly, whenever a pair of collating discs is operative to control movement of a group of successive bags 14, the discs are only required to move from open to closed to open positions for a complete cycle of operation corresponding to each bag advanced thereto.

Similarly, during a transition period when one pair of collating discs is gripping and angularly displacing the final bag of a collated group of bags (e.g., the group 120a) and the other pair of discs is about to grip the next successive bag which will define the first bag of the following group (e.g., the group 120b), it is only necessary for the then operative one pair of discs to close upon and rotate the final bag, open to release the same, and thereafter remain in the open position thereof while the other pair of discs becomes operative to control movement of the next group of bags. Thus, to become inoperative, the cycle of operation of either pair of collating discs is simply temporarily terminated with the discs in the open position thereof, and then the next bag and each succeeding bag thereafter for a total number which together form the following collated group, are each displaced through the space 66 defined between such open discs.

While in the foregoing specification an embodiment of the invention has been described in considerable detail for purposes of making a complete disclosure thereof, it will be apparent to those skilled in the art that numerous changes may be made in such details without departing from the spirit and principles of the invention.

What is claimed is:

1. In a collator for relatively flat articles such as folded grocery bags and the like, a pair of spaced apart collating mechanisms defining a path of movement therebetween along which such articles are successively advanced in a predetermined orientation, each of said mechanisms comprising a pair of rotatable discs disposed in facing relation and being movable between a closed article-gripping position and an open article-passing position, said pairs of discs being transversely aligned with respect to such path of movement and the space defined between each pair of discs in the open position thereof being sufficiently great that an article can pass freely therethrough, drive mechanism for rotating the two pairs of discs respectively comprised by said mechanisms in opposite angular directions toward each other along such path of movement, actuating mechanism for repetitively displacing selectively one or the other pair of discs between the open and closed positions thereof throughout a period corresponding to the advancement of a predetermined number of articles along such path toward said collating mechanisms and in timed relation with the advancement of such articles so as to grip and rotate each and thereby reorient the same to form collated groups thereof, and timing mechanism for selectively maintaining one pair of discs in the open position thereof during such period that the other pair is repetitively displaced between open and closed positions and vice versa, each article gripped and rotated by any one pair of discs to effect such reorientation being displaced angularly through the space then defined between the other pair of discs.

2. In a collator for relatively flat articles such as folded grocery bags and the like, a pair of spaced apart collating mechanisms defining a path of movement therebetween along which such articles are successively advanced in a predetermined orientation, each of said mechanisms comprising a pair of rotatable discs disposed in facing relation one of which is translationally fixed and the other being movable with respect thereto between a closed article-gripping position and an open article-passing position, said pairs of discs being transversely aligned with respect to such path of movement and the space defined between each pair of discs in the open position thereof being sufficiently great than an article can pass freely therethrough, drive mechanism for rotating the two pairs of discs respectively comprised by said mechanisms in opposite angular directions toward each other along such path of movement, actuating mechanism for repetitively displacing selectively the aforesaid other disc of one or the other pair of discs between the open and closed positions thereof throughout a period corresponding to the advancement of a predetermined number of articles along such path toward said collating mechanisms and in timed relation with the advancement of such articles so as to grip and rotate each and thereby reorient the same to form collated groups thereof, and timing mechanism for selectively maintaining one pair of discs in the open position thereof during such period that the other pair is repetitively displaced between open and closed positions and vice versa, each article gripped and rotated by any one pair of discs to effect such reorientation being displaced angularly through the space then defined between the other pair of discs.

3. The collator of claim 2 in which said drive mechanism is operative to continuously rotate each of said discs.

4. The collator of claim 2 in which each of said collating mechanisms includes frame structure, bearing means carried by said frame structure for supporting the aforesaid one disc for rotation while constraining the same against translational displacements, a casing element rotatably supported by said frame structure and being provided with a passageway therethrough, a shaft extending through said passageway and being equipped at one end thereof with the aforesaid other of said discs and being axially displaceable with respect to said casing to move such other disc between the aforementioned open and closed positions, and structure interrelating said shaft and casing so as to constrain the same against relative rotation but affording axial displacements of said shaft with respect to the casing, said drive mechanism being connected with said casing for rotating said other disc therethrough and said timing mechanism being connected with said shaft for controlling axial displacements thereof.

5. The collator of claim 2 in which said timing mechanism includes a pair of cycling cams respectively associated with said collating mechanisms and having a phase relationship with respect to each other such that one pair of discs is maintained in its open position while the other pair of discs is permitted to cycle between the open and closed positions thereof, and said timing mechanism including displacement cams respectively associated with said collating mechanisms and being operative to control movement of the discs thereof between their open and closed positions whenever the associated cycling cam is not maintaining such discs in the open positions thereof.

6. The collator of claim 2 in which each of said collating mechanisms includes frame structure, bearing means carried by said frame structure for supporting the aforesaid one disc for rotation while constaining the same against translational displacements, a casing element rotatably supported by said frame structure and being provided with a passageway therethrough, a shaft extending through said passageway and being equipped at one end thereof with the aforesaid other of said discs and being axially displaceable with respect to said casing to move such other disc between the aforementioned open and closed positions, structure interrelating said shaft and casing so as to constrain the same against relative rotation but affording axial displacements of said shaft with respect to the casing, said drive mechanism being connected with said casing for rotating said other disc therethrough and said timing mechanism being connected with said shaft for controlling axial displacement thereof, and in which said timing mechanism includes a pair of cycling cams respectively associated with the shafts of said collating mechanisms and having a phase relationship with respect to each other such that one pair of discs is maintained in its open position while the other pair of discs is permitted to cycle between the open and closed positions thereof, and said timing mechanism including also a pair of displacement cams respectively associated with the shafts of said collating mechanisms and being operative to control movement of the discs thereof between their open and closed positions whenever the associated cycling cam is not maintaining such discs in the open positions thereof.

7. The collator of claim 6 in which said drive mechanism is operative to continuously rotate each of said discs.

8. In a collator for relatively flat articles such as folded grocery bags and the like, a pair of spaced apart collating mechanisms defining a path of movement therebetween along which such articles are successively advanced in a predetermined orientation and said mechanisms being selectively operative to grip and rotate each such article and thereby reorient the same to form collated groups thereof, a discharge conveyor for receiving each reoriented article to advance the same toward a discharge station, and an article-displacing kicker disposed along such path of movement and being cyclicly movable in timed relation with said article collating mechanism for engaging each article reoriented thereby to positively initiate movement thereof in the direction toward such discharge station as defined by said discharge conveyor.

9. In a collator for relatively flat articles such as folded grocery bags and the like, a pair of spaced apart collating mechanisms defining a path of movement therebetween along which such articles are successively advanced in a predetermined orientation and said mechanisms being selectively operative to grip and rotate each such article and thereby reorient the same to form collated groups thereof, a pair of spaced apart spiral conveyors each provided with a helical flight and being disposed along such path of movement for receiving each reoriented article and being operative to displace the same through the helical flights thereof, and an article-displacing kicker disposed along such path of movement intermediate such spiral conveyors and being cyclicly movable in timed relation with said collating mechanisms for engaging each article reoriented thereby to positively displace the same into the helical flights of said conveyor elements.

10. The collator of claim 9 in which said article-displacing kicker is pivotally supported along such path for movements between a retracted position substantially outwardly of such path to enable articles to move freely therealong and an extended position in which it projects into such path to engage each such reoriented article and positively displace the same into the flights of said conveyor elements.

11. In a collator for relatively flat articles such as folded grocery bags and the like, a pair of spaced apart collating mechanisms defining a path of movement therebetween along which such articles are successively advanced in a predetermined orientation, each of said collating mechanisms comprising a pair of rotatable discs oriented in facing relation and being movable between a closed article-gripping position and an open article-passing position and in the closed position thereof being operative to grip and rotate an article advanced along such path so as to reorient the same into the collated groups thereof, a pair of spaced apart spiral conveyors each provided with a helical flight and being disposed along such path of movement for receiving each reoriented article and being operative to displace the same through the helical flights thereof, and an article-displacing kicker disposed along such path of movement intermediate such spiral conveyors and being cyclicly movable in timed relation with said collating mechanisms for engaging each article reoriented thereby to positively displace the same into the helical flights of said conveyor elements.

12. The collator of claim 11 in which said article-displacing kicker is pivotally supported along such path for movements between a retracted position substantially outwardly of such path to enable articles to move freely therealong and an extended position in which it projects into such path to engage each such reoriented article and positively displace the same into the flights of said conveyor elements.

13. The collator of claim 11 in which said drive mechanism is operative to continuously rotate each of said discs.

14. In a collator for relatively flat articles such as folded grocery bags and the like, a pair of spaced apart collating mechanisms defining a path of movement therebetween along which such articles are successively advanced in a predetermined orientation, each of said mechanisms comprising a pair of rotatable discs disposed in facing relation and being movable between a closed article-gripping position and an open article-passing position, said pairs of discs being transversely aligned with respect to such path of movement and the space defined between each pair of discs in the open position thereof being sufficiently great that an article can pass freely therethrough, a discharge conveyor for receiving each reoriented article to advance the same toward a discharge station, an article-displacing kicker disposed along such path of movement and being cyclicly movable in timed relation with said article collating mechanism for engaging each article reoriented thereby to positively initiate movement thereof in the direction toward such discharge station as defined by said discharge conveyor, drive mechanism for rotating the two pairs of discs respectively comprised by said mechanisms in opposite angular directions toward each other along such path of movement, actuating mechanism for repetitively displacing selectively one or the other pair of discs between the open and closed positions thereof throughout a period corresponding to the advancement of a predetermined number of articles along such path toward said collating mechanisms and in timed relation with the advancement of such articles so as to grip and rotate each and thereby reorient the same to form collated groups thereof, and timing mechanism for selectively maintaining one pair of discs in the open position thereof during such period that the other pair is repetitively displaced between open and closed positions and vice versa, each article gripped and rotated by any one pair of discs to effect such reorientation being displaced angularly through the space then defined between the other pair of discs.

15. In a collator for relatively flat articles such as folded grocery bags and the like, a pair of spaced apart collating mechanisms defining a path of movement therebetween along which such articles are successively advanced in a predetermined orientation, each of said mechanisms comprising a pair of rotatable discs disposed in facing relation one of which is translationally fixed and the other being movable with respect thereto between a closed article-gripping position and an open article-passing position, said pairs of discs being transversely aligned with respect to such path of movement and the space defined between each pair of discs in the open position thereof being sufficiently great that an article can pass freely therethrough, a pair of spaced apart spiral conveyors each provided with a helical flight and being disposed along such path of movement for receiving from said collating mechanisms each reoriented article and being operative to displace the same through the helical flights, an article-displacing kicker disposed along such path of movement intermediate such spiral conveyors and being cyclicly movable in timed relation with said collating mechanisms for engaging each article reoriented thereby to positively displace the same into the helical flights of said conveyor elements, drive mechanism for rotating the two pairs of discs respectively comprised by said mechanisms in opposite angular directions toward each other along such path of movement, actuating mechanism for repetitively displacing the aforesaid other disc of one or the other pair of discs between the open and closed positions thereof throughout a period corresponding to the advancement of a predetermined number of articles along such path toward said collating mechanisms and in timed relation with the advancement of such articles so as to grip and rotate each and thereby reorient the same to form collated groups thereof, and timing mechanism for selectively maintaining one pair of discs in the open position thereof during such period that the other pair is repetitively displaced between open and closed position and vice versa, each article gripped and rotated by any one pair of discs to effect such reorientation being displaced angularly through the space then defined between the other pair of discs.

16. The collator of claim 15 in which each of said discs is continuously rotated, and in which said article-displacing kicker is pivotally supported along such path for movements between a retracted position substantially outwardly of such path to enable articles to move freely therealong and an extended position in which it projects into such path to engage each such reoriented article and positively displace the same into the flights of said conveyor elements.

17. The collator of claim 16 in which each of said collating mechanisms includes frame structure, bearing means carried by said frame structure for supporting the aforesaid one disc for rotation while constraining the same against translational displacements, a casing element rotatably supported by said frame structure and being provided with a passageway therethrough, a shaft extending through said passageway and being equipped at one end thereof with the aforesaid other of said discs and being axially displaceable with respect to said casing to move such other discs between the aforementioned open and closed positions, structure interrelating said shaft and casing so as to constrain the same against relative rotation but affording axial displacements of said shaft with respect to the casing, said drive mechanism being connected with said casing for rotating said other disc therethrough and said timing mechanism being connected with said shaft for controlling axial displacement thereof, and in which said timing mechanism includes a pair of cycling cams respectively associated with the shafts of said collating mechanisms and having a phase relationship with respect to each other such that one pair of discs is maintained in its open position while the other pair of discs is permitted to cycle between the open and closed positions thereof, and said timing mechanism including also a pair of displacement cams respectively associated with the shafts of said collating mechanisms and being operative to control movement of the discs thereof between their open and closed positions whenever the associated cycling cam is not maintaining such discs in the open positions thereof.

18. In a collator for reorienting relatively flat articles such as folded grocery bags and the like which are successively advanced along a path of movement in predetermined orientation to arrange such articles into oppositely oriented groups for packaging, a collator mechanism comprising frame structure, a first collating disc rotatably carried by said frame structure and being constrained against translational displacements, a casing element rotatably supported by said frame structure and being provided with a passageway therethrough, a shaft extending through said passageway and being equipped adjacent one end thereof with a second collating disc oriented in facing relation with said first disc, said shaft being axially displaceable with respect to said casing so as to move said second disc relative to said first disc between a closed article-gripping position and an open article-passing position, drive structure interrelating said shaft and casing so as to constrain the same against relative rotation but affording axial displacements of said shaft with respect to said casing, drive mechanism connected with said first disc and with said casing for rotating each of said discs, and timing mechanism connected with said shaft for controlling axial displacement thereof.

19. The collator of claim 18 in which said drive mechanism is operative to continuously rotate each of said discs, and in which said timing mechanism includes a displacement cam operatively connected with said shaft to control axial displacements thereof.

References Cited

UNITED STATES PATENTS 3,135,175   6/1964   Dexter _______________ 93—93

BERNARD STICKNEY, *Primary Examiner.*